Patented Aug. 3, 1943

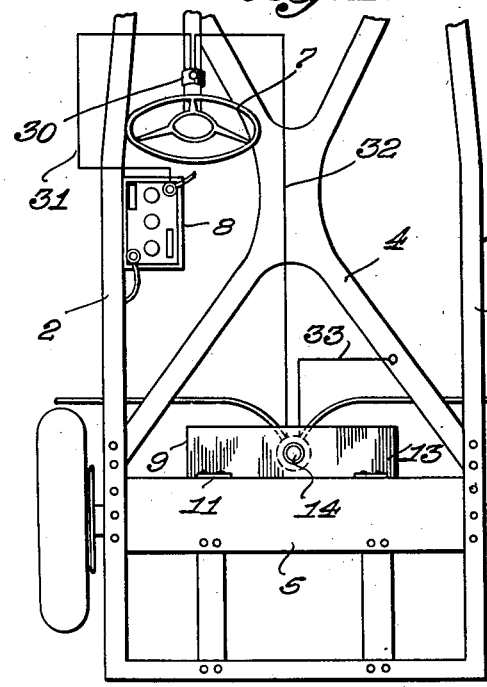
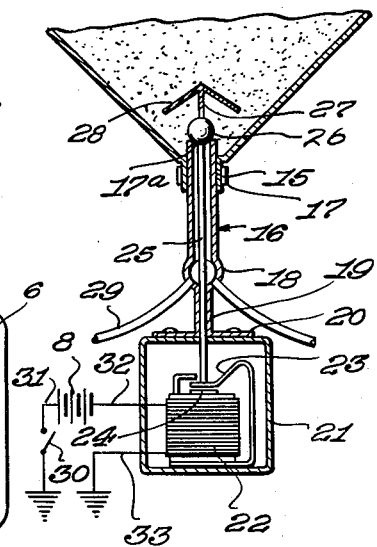
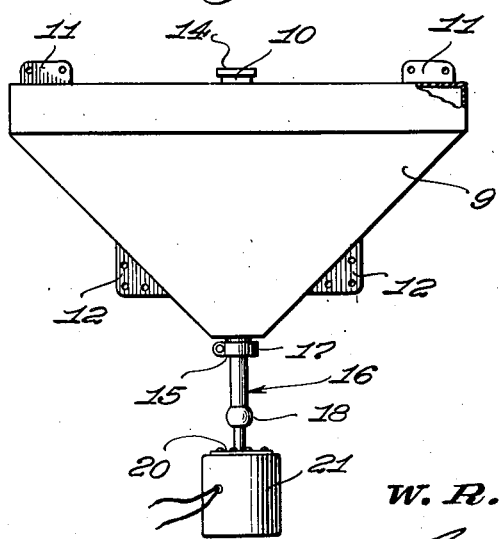

2,325,970

UNITED STATES PATENT OFFICE 2,325,970

SANDER

Walter R. Myers, Altoona, Pa.

Application February 26, 1942, Serial No. 432,493

1 Claim. (Cl. 291—36)

This invention relates generally to traction devices and more particularly to an improved sander for automobiles.

One object of the invention is to provide a sander which will be operative for depositing sand in advance of the driving wheels of a motor vehicle for preventing sliding of said wheels on a slippery surface.

Another object of the invention is to provide a sander which may be built into new vehicles or may be installed in vehicles already in use.

A further object of the invention is to provide a device of this character employing combined valve and agitating mechanism.

As still another object, the invention seeks to provide a sander which is simple in construction.

And another object of the invention is to provide a sander which can be controlled by the driver of the vehicle by a switch on the steering wheel.

Other objects of the invention will appear during the course of the following description.

In the drawing:

Figure 1 is a fragmentary top plan of the chassis of a motor vehicle and showing my improved sander as it would appear installed on said chassis, Figure 2 is an enlarged detail sectional view, partly in elevation, showing particularly the valve and agitating mechanism, and Figure 3 is a side elevation of the sander ready for installation.

Referring now to the drawing, the numeral 1 indicates in general the chassis of a motor vehicle. The chassis 1 includes side members 2 and 3, an X frame support 4 and a cross member 5, said cross member being disposed near the rear of the chassis. The chassis carries the usual wheels, the rear ones of which are shown at 6. A portion of the steering wheel is shown at 7 and the battery at 8.

In carrying my invention into effect, I employ a body 9 which is formed of heavy sheet metal or other suitable material and which, as best shown in Figure 3, is substantially V-shaped in side elevation. The body 9 is rectangular in top plan and includes a filler neck 10. The body is secured to the cross member 5 by bolts or other fastening devices which extend through pairs of ears 11 and 12. The pair of ears 11 is mounted on the upper end of the inner wall of the body while the pair of ears 12 is mounted on the inner wall near its lower end. As will be seen, the ears 12 are substantially triangular in shape.

The body is closed at its upper end by a removable top wall 13 which carries, medially of its length, the filler neck 10. The filler neck is closed at its upper end by a cap 14. In this connection, it should be understood that the body is so disposed that the filler neck will be positioned between the rear wall of the body of the vehicle and the rear seat thereof so that it will only be necessary to remove the rear seat to gain access to the filler neck.

As best seen in Figure 2, the body 9 carries, at its lower end, a discharge spout 15 which is formed integral with the body and is of cylindrical shape. Associated with the body is a discharge pipe 16. The discharge pipe is formed of sheet metal and has its upper end portion extending into the body through the discharge spout 15. A clamp 17 is fitted about the spout 15, which spout is slotted, if thought necessary, for rigidly holding the upper end of the pipe 16 in place. The upper end of the pipe 16 defines a valve seat 17a, the purpose for which will be set forth in more detail hereinafter.

The pipe 16 is relatively large in diameter throughout the upper three-fourths of its length and said relatively large portion terminates at its lower end in a discharge chamber 18, which is substantially bell shaped. Below the discharge chamber, the pipe 16 is restricted to form a reduced extension or guide 19 and, formed on the lower end of said guide or extension 19, is a circular attaching flange 20.

Riveted or otherwise suitably secured to the flange 20, in axial relation to the pipe 16, is a cylindrical casing 21 and mounted axially within the casing is a vibrator 22, said vibrator having an armature 23 and a pole piece 24.

The numeral 25 indicates the valve stem of my device. The valve stem 25 is slidably mounted in the guide 19 and extends throughout the length of the discharge pipe and downwardly into the casing 21 where it is connected with the armature 23. The upper end of the stem 25 carries a ball valve 26 which is engageable with the valve seat 17a. In this connection, it should be understood that, if desired, valves of other shapes may be employed in lieu of the ball valve 26. Mounted on the ball valve, axially thereof and extending upwardly into the body 9, is a supporting stem 27 and mounted on the upper end of the supporting stem is a substantially conical agitator 28. As will be pointed out in more detail hereinafter, the agitator also serves as a deflector.

In order to lead sand to points from which it may drop to the surface of the ground in front of the wheels 6, I provide discharge tubes 29 which have their corresponding inner ends connected with the discharge chamber 18. The tubes 29 can be made of soft copper or other suitable material and are of a sufficient diameter to allow free sand flow.

The vibrator is to be energized by current from the battery 8. To permit ease of control of my sander, I employ a switch 30 which is mounted on the steering post which supports the steering wheel 7. The switch may be of the push button type and has one terminal connected with the battery 8 by a conductor 31. The other terminal of the switch is connected with one terminal of the vibrator by a conductor 32. The other terminal of the vibrator is connected with the ground by a conductor 33. The battery, of course, has its negative terminal grounded.

The operation of my improved sander will now be briefly described.

Sand is, of course, first placed in the body 9 in the manner described hereinbefore. When the motor vehicle is being driven over icy surfaces or surfaces made slippery by other causes, and it is desired to improve traction, the driver closes the switch 30 and the vibrator 22 is thus energized. When this is done, the valve stem 25 will be intermittently shifted upwardly for intermittently unseating the valve 26. Sand will thus be permitted to flow, intermittently, through the discharge pipe 16 and through the tubes 29 to points where it may fall on the slippery surface ahead of the wheels 6. The sand will, of course, improve traction.

When the stem 25 is shifted, the agitator 28 will also be shifted for keeping the sand in a flowing condition in the body. It is desired to point out, also, that the agitator will act as a deflector and will deflect flow of sand from above the valve so that free movement of the valve will be assured.

It is recognized that the stem 25 will be required to lift against the weight of the sand in the body. However, in view of the fact that the agitator is conical in shape and the fact that the stem travels but a short distance, it is thought that movement of the stem will not be arrested by the weight of the sand.

My improved sander is of simple construction and may be easily installed on vehicles already in use or installed on them during manufacture.

Having thus described the invention, what is claimed as new is:

A sander including a body having a discharge spout, a discharge pipe having its upper end provided with a valve seat and its intermediate portion enlarged laterally to form a circumferential chamber, means securing the upper end of the discharge pipe in the spout, said pipe having its lower end reduced in diameter to form a guide having a lateral attaching flange at its lower end, a casing secured to the flange, a valve stem shiftable in the discharge pipe, a valve on the valve stem and engageable with said seat, a vibrator in the casing and connected with the valve stem, said vibrator being energizable for shifting the stem and valve for allowing sand flow from the body, and pipes communicating with said chamber for leading sand to surfaces in advance of vehicle wheels for aiding traction thereof.

WALTER R. MYERS.